United States Patent [19]

Göllnitz et al.

[11] Patent Number: 4,756,058
[45] Date of Patent: Jul. 12, 1988

[54] ELECTRONIC CONTROL APPARATUS FOR CONTROLLING SETTING ELEMENTS IN A FISH PROCESSING MACHINE

[75] Inventors: Holger Göllnitz, Lübeck; Franz Hartmann, Bad Oldesloe, both of Fed. Rep. of Germany

[73] Assignee: Nordischer Maschinenbau Rud. Baader GmbH + Co KG, Lubeck, Fed. Rep. of Germany

[21] Appl. No.: 81,825

[22] Filed: Aug. 5, 1987

[30] Foreign Application Priority Data

Aug. 14, 1986 [DE] Fed. Rep. of Germany ....... 3627621

[51] Int. Cl.⁴ ............................................. A22C 25/00
[52] U.S. Cl. ......................................................... 17/54
[58] Field of Search ..................................... 17/54, 1 R

[56] References Cited

U.S. PATENT DOCUMENTS 4,291,435 9/1981 Hartmann ............................. 17/54 X
4,557,019 12/1985 Van Devanter et al. ........... 17/54 X
4,601,083 7/1986 Shoji et al. ............................... 17/54

Primary Examiner—Willie G. Abercrombie
Attorney, Agent, or Firm—Thomas R. Morrison

[57] ABSTRACT

The main purpose is to provide an electronic controlling apparatus for controlling the setting members for processing tools and guides of a fish processing machine, which apparatus is easy to handle and designed to guarantee a disturbance-free operation. To this end, there is provided a first module as central computer, a second module comprising a signal amplifier and adapting means, as well as third module designed as a computer periphery circuit. The third module comprises a control unit commonly forming memory, combinatorial and control means, as well as an input part and an output part, which are provided for signal decoupling, signal noise suppressing and signal processing. In particular, each module is designed in the form of a plate, the three plates being interconnected electrically and mechanically for forming a structural unit.

20 Claims, 6 Drawing Sheets

ELECTRONIC CONTROL APPARATUS FOR CONTROLLING SETTING ELEMENTS IN A FISH PROCESSING MACHINE

BACKGROUND OF THE INVENTION

1. Field of the Invention

The invention relates to an electronic controlling apparatus to be used in a fish processing machine for controlling setting and/or positioning elements adapted to set the time of operation and the control paths of tools and guides provided for said fish processing and arranged along a fish conveying path in said fish processing machine, the apparatus comprising a programmable central processing unit (CPU) for storing fish species data and data of the machine, as well as memory, combinatorial and controlling means for detected fish value data, input and output control data.

2. Prior Art

In a known controlling apparatus of this type (German patent No. 29 27 583), a relatively small number of functional elements is obtained when using a method based thereon, which elements basically permit a universal operation of a fish processing machine, as well as an individual influencing with regard to time of the setting elements, whilst determining precise control values. However, in practice, it has been found that environmental influences occurring during fish machine operation, such as e.g. vibrations and voltage and current surges caused by power units, together with moisture and temperature influences lead to major problems and event to complete breakdowns. In order to obviate these disadvantages, sensitively operating and reacting electronic subassemblies had to be removed from the immediate vicinity of the fish processing machine, so that particularly in the case of high speed operation, e.g. for pinbone-free cutting, susceptibility to trouble cannot be removed to an adequate extent. By moving and by relatively widely spaced reciprocal arrangement of subassemblies maintenance, ease of operation, universal use and operation possibilities, self-monitoring, rapid, comprehensive and well-arranged operating displays, as well as inexpensive manufacture and operation are impaired to a significant extent or are even made impossible.

Problems of this type already occur in a not universally operating, and otherwise complicated and electronic fish machine control arrangement only usable to a restricted extent (DE-OS No. 27 47 386). In this case, on the one hand, power amplifiers or power parts operating tool setting and positioning elements are housed together with a consequently trouble-prone computer in a control unit, and on the other hand, as far as possible, the latter is arranged well spaced from disturbance sources, such as the fish cutting area and conveying devices.

3. Objects of the Invention

With a view to overcoming fish machine-specific problems, it is a major object of the present invention to adapt and construct an electronic controlling apparatus for the control of tools and guides in a fish processing machine in such a manner that it can be installed and integrated in a fish machine by way of a compact and well-arranged construction.

It is another important object of the present invention that the apparatus be easy to operate and well-arranged.

According to yet another object of the present invention, the apparatus should be capable of being easily maintained and handled.

It is still a further object of the present invention to safeguard characteristics of the apparatus such as universal and reliable usability, adjustability and the possibility of extensive data processing and handling.

According to further important objects of the present invention, the apparatus is to be protected against mechanical vibrations due to operation, as well as against electrical current or voltage magnitudes, surges or superimpositions occurring during the operation of machine setting elements or power parts.

Other essential objects of the present invention lie in that computer operations, as well as control sequence processes can be monitored regularly and performed in trouble-free manner, even at high operating speeds.

SUMMARY OF THE INVENTION

In an electronic controlling apparatus comprising a programmable central processing unit (CPU) for storing fish species data and data of the machine, as well as memory, combinatorial and controlling means for detected fish value data, input and output control data, these objects are achieved in that the apparatus includes a first structural unit or module forming the central processing unit; a second structural unit or module connected to the first one and comprising signal amplifying and adapting means; and a third structural unit or module designed as a peripheral circuit for the central processing unit, which third unit comprises a control unit, connected to the second unit and also forming the memory (storage), combinatorial and controlling means, as well as an input part and an output part, each connected to the control unit and provided for signal conditioning, decoupling and disturbance elimination.

By means of the design, structure, arrangement and association of independent units or modules according to the present invention, a compact electronic controlling apparatus is provided which, as a result of the concentration and specific interconnection of functions and whilst exploiting its inherent electronic possibilities, such as, for example, high operating speeds, precision and universal adjustability, can be housed as an easily installable overall functional unit, particularly within a controlled fish processing machine, the formation, restriction, adapted interconnection and spatial association of functions ensuring reliable shielding and protection against electrical, mechanical and fish machine-based environmental influences, together with ease of operation and maintenance and well-arranged monitoring possibilities displayable on one unit.

As a result of the compact apparatus, which can be positioned directly on or in the fish machine, all the operating and signal states, as well as correct functional sequences can, according to a specific embodiment of the invention, be monitored immediately, even by untrained personnel, in that the input part and output part comprise optical display elements, preferably light-emitting diodes, for all the detected fish value data, as well as for signals representing input and output control data. With the aid of such displays, it is possible to monitor in a localizing manner the operation of storage and fish machine control zones. It is particularly appropriate for the continuous checking of a detecting or measuring process that the output part comprises a fish size display circuit with a register, a decoding stage and a multiposition segment display for the fish size.

Trouble-proneness of the electronic controlling apparatus can also be eliminated in addition to the zone subdivision of the circuit parts and the functionally independent input and output parts located on the outer peripherary of the unit, which, according to another aspect of the invention, is achieved in that the input and output parts incorporate converters or elements for galvanic decoupling, particularly optical couplers. The coupling times thereof can be simply adapted to the fish detection value (data) times and pulse signal speeds and have a directional or filter characteristic ensuring the elimination of interference and/or other disturbance. The electronic operation can be made undisturbed from environmental influences in a particularly advantageous manner in that the input part is additionally provided with input circuits for suppressing interference and/or other types of disturbances, as well as for stabilizing input signals. It is particularly appropriate that a fish conveyance input pulse circuit of the input part associated with the fish path comprises a signal conditioning and pulse shaping circuit.

For generating and transmitting signals between the controlling apparatus and power parts, a particularly advantageous matching or adaptation is achieved in that the output part has a stepping motor setting pusle circuit for generating and delivering stepping motor setting pulse signals, which circuit comprises an input gate, particularly an inverted exclusive-OR gate, an inverter, a time stage and a push-pull output stage.

In order to be able to supply to the stepping motor setters or amplifiers in a particularly trouble-free manner control signals necessary for the positioning/setting of tools, the output part can be provided with a circuit for delivering a deenergizing signal, a rotation direction signal, as well as a resetting signal for a stepping motor, said circuit comprising a signal conditioning circuit as well as a push-pull output stage, respectively. Thus, low-ohmic(-impedance) adaptation and processing of signal levels of only a specific size are achieved in the output stage.

As a further development, additional protection against overloading of output stages is achieved in that the latter are provided with thermal monitoring means.

A particularly advantageous embodiment of the invention may consist in that, in the output part of the peripheral circuit, control means for the fish conveyance and tool drive are provided with an output stage, which produces voltages and currents suitable for relay control and preferably comprises electronic switches in the form of Darlington transistors. It is particularly appropriate to protect and secure the output stage against overloads by a current limiting circuit.

To further protect the apparatus against disturbances and faults such as malfunction, interruption and interference, it is particularly appropriate to provide circuits for producing four separate supply voltages for the supply of the apparatus. This leads to an additional decoupling between the computer and the control unit, as well as between the fish machine, its power parts or setting/positioning elements, on the one hand, and the input and output parts of the peripheral circuit connected to the relays, on the other.

The control unit of the peripheral circuit according to the invention permits its connection to a preselection/position switch unit as a result of its arrangement and operation in a further development of the present invention. Thus, it is possible to bring about a simple setting for adapting, for example, to fish species and fish quality as well as to processing processes, such as, for example, removing bones, filletting, and decapitating, without interrupting the operation of the fish machine and therefore without any time loss, preferably by arranging the controlling apparatus directly on the fish machine. These electronic setting possibilities replace mechanical conversion, such as, for example, the replacement and substitution of control cams, so that there are no mechanical parts subject to wear, the electronic (pre)setting functioning in wear-free manner.

With a view to a particularly great combinatorial, storage and signal processing depth, i.e. for obtaining a large number of control processes for the fish processing and for specifically ensuring computer-relieving control performances, a particularly advantageous embodiment of the invention consists in that the control unit comprises four memory and combinatorial components, the first component being provided with an input for priority processing, and storing and generating control signals corresponding to stepping motor rotation direction, deenergizing and resetting signals, the second component storing and generating serial display data, as well as control signals corresponding to knife motor and fish conveyance signals, the third component storing and generating pulse sequence values for a stepping motor, and the fourth component being provided for interrogating and activating a switch unit for preselection and setting. The first storage and combinatorial component detects signals according to their significance, so that, for example, a current processing of fish position-interrogating signals or machine type signals is interrupted and an intermediately reported fish conveying pulse signal is dealt with in priority manner or signals corresponding to fish conveyance only are processed by the first component. Through the subdivision of the control unit into specific functional groups for specific signals a high combinatorial, storage and processing depth is achieved in a small space, so that comprehensive control performances relieving the central processing unit can take place, the connection and circuiting of the elements to the adapting means, as well as to the input and output parts being well-arranged and compact.

In order to be able to make sure that the controlling apparatus is functioning correctly, i.e. to be able to examine data flows and check flow processes, it is particularly advantageous that the peripheral circuit comprises a test programme-storing memory device and is connected between the control unit and the adapting means. Such a device can be provided in a simple manner and is protected against disturbances in the same way as the control zone relieving the central processing unit.

A particularly advantageous embodiment of the invention consists in that the apparatus is designed with three electrically and mechanically connected mounting plates as a constructional unit for the installation in and/or the connection to a fish processing machine, a first plate carrying the second structural unit or module, a second plate the first structural unit or module and a third plate the third structural unit or module, the mounting plates being interconnected in this order and being, in particular, stacked. Although the controlling apparatus is designed and constructed as a compact unit, the aforementioned arrangement makes it possible, in a particularly advantageous manner, to arrange the individual modules designed for specific functions in a spatially separated manner and in a confined space, so that within the apparatus electronic superimpositions, i.e. undesired reactions can be avoided. This also results in a vibration-proof constructional unit, which can be installed and handled particularly easily and is mechanically stable.

BRIEF DESCRIPTION OF THE DRAWINGS

Other and further objects of the present invention will be apparent from the following description and claims and are illustrated in the accompanying drawings which by way of illustration schematically show preferred embodiments of the present invention and the principles thereof and what now are considered to be the best modes contemplated for applying these principles. Other embodiments of the invention embodying the same or equivalent principles may be used and structural changes may be made as desired by those skilled in the art without departing from the present invention and the scope of the appended claims. In the drawings

DETAILED DESCRIPTION OF THE PREFERRED EMBODIMENT

Figure 1:
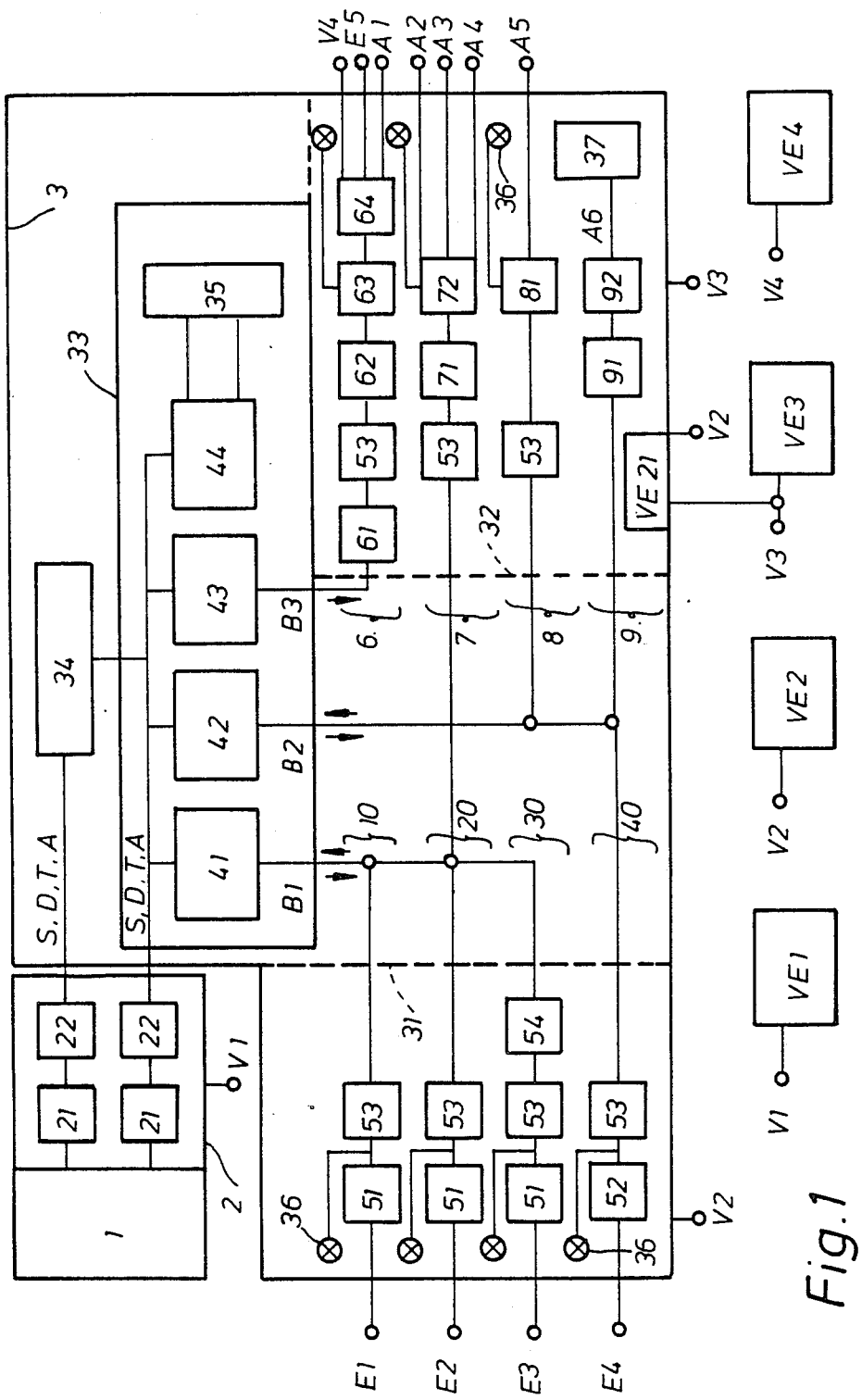
FIG. 1 shows a block diagram of an apparatus according to the present invention.

A controlling apparatus as shown in FIG. 1 comprises a computer 1 forming a central processing unit (CPU), i.e. a central processing and handling unit, a structural unit or module 2 including a signal amplifier 21 and an adapting circuit 22, as well as a structural unit or module 3 as a peripheral circuit connected across the module 2 to the computer 1. The peripheral circuit 3 comprises a control unit 33 with a test programme memory or storage device 34 connected in parallel thereto, an input part 31 and an output part 32. The control unit 33 is constructed with memory/storage and combinatorial components 41, 42, 43, 44. The input part 31 is equipped with control parameter input circuits 10 and 20, an input pulse generating circuit 30 and an input circuit 40 for detected and/or measured fish values/data, also referred to as fish detection value input circuit 40 in the specification and claims. The output part 32 comprises a stepping motor (SM) setting pulse generating circuit 6, an SM-state control circuit 7, a fish conveyance and tool drive circuit 8 and a display circuit 9.

The modules and/or circuitry parts and elements are interconnected by means of controlled data bus lines ensuring a data transfer and exchange. In particular, the memories or registers of the components 41 to 44 and 34 are connected to the adapting circuits 22 across control lines S for activating the respective module necessary for operation, for determining the data flow to the computer or for bringing about an output state of a component, across data (e.g. SM pulse spacing, measured values, display values, control values)-supplying and reading data lines D, across operating or synchronizing cycle-supplying clock or timing lines T, across address lines A and across data lines for test programmes. The components 41, 42, 43 and 44 can be controlled across read/write (R/W) lines in a data or signal-reading in or supplying mode, so that input/output ports of the components can be activated altogether or individually, as required. Correspondingly, there are lines B1, B2, B3 with directional arrows representing the data flow.

The apparatus is subject to the action of and controlled by specific signal groups E1, E2, E3, E4, E5 associated with the input circuits 10, 20, 30, 40 and the output circuit 6. The output circuits 6, 7, 8 deliver signal groups A1, A2, A3, A4 and A5.

The circuits 10, 20, 30, 40 or 6, 7 and 8 of the input and output parts 31, 32 are equipped with circuits 53 having optical couplers. These signal transmitters are used for a galvanic separation or isolation between electrically sensitive control zones (computer/memory control zone) and circuits or signal generators connected to a fish machine (fish machine control zone). The couplers operate in accordance with a transmitter-receiver principle, so that they have a directional or filter characteristic and are adapted to the signal or pulse speeds or rates. Thus, they ensure a galvanic separation and adaptation between signal levels, e.g. 5 volts for the memory control zone and 24 volts for control signals applied to the control apparatus or supplied by it, so that the control unit 33, in particular, is kept free from disturbances and problems, and, vice versa, disturbances within the inner zone of the controlling apparatus are not transferred to the outer zones thereof.

Light-emitting diodes 36 are provided as optical display elements in the signal lines of input and output part 31, 32, in order to permit a simple optical monitoring of the occurrence, flow and sequence of all signals to the controlling apparatus.

Figure 2:
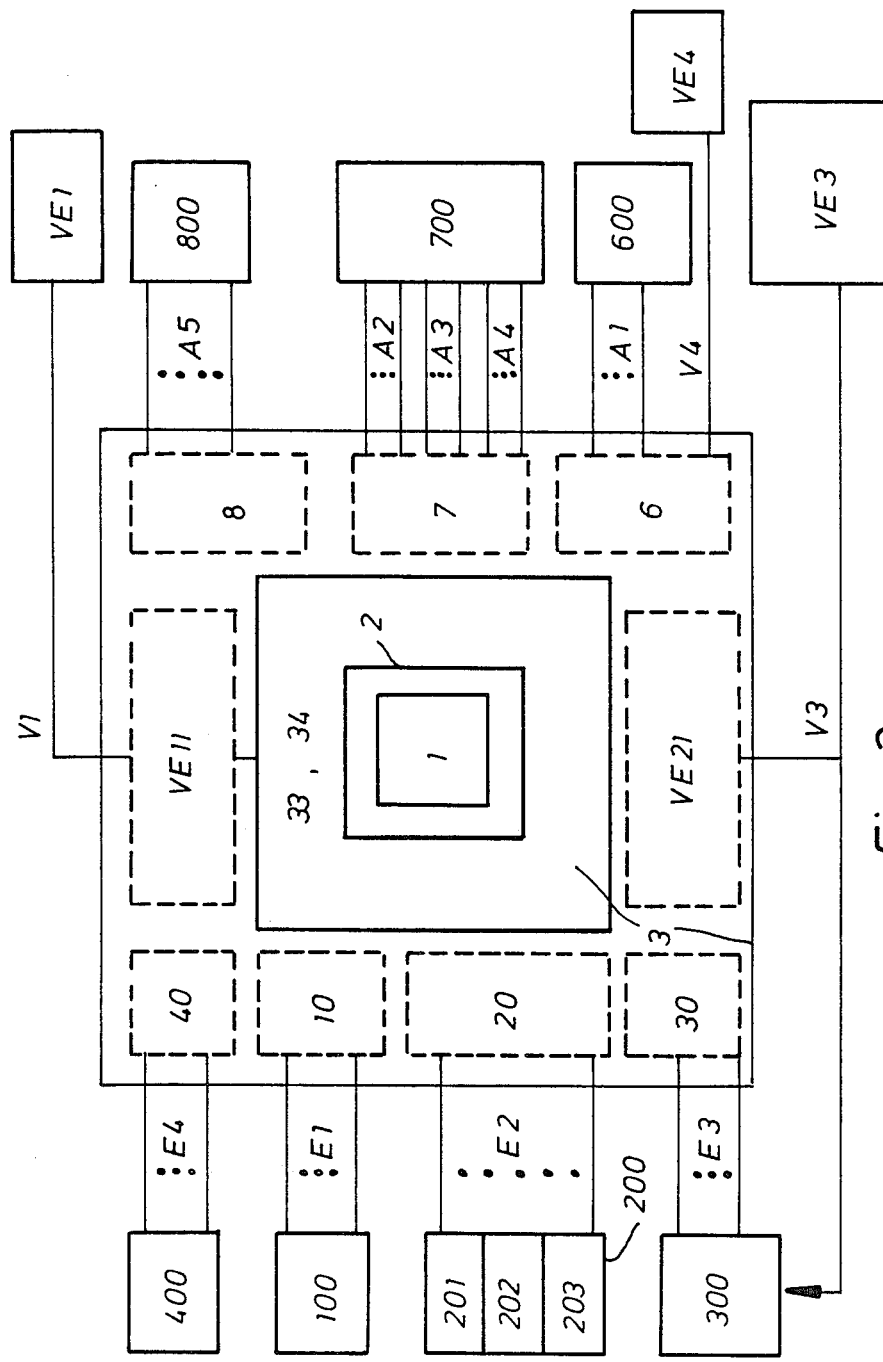
FIG. 2 shows details of the circuiting of an apparatus according to the present invention.

FIG. 2 shows the circuiting of a trouble-proof controlling apparatus constructed according to the present invention and having signal generators or censors 200, 300, 400 provided in or on a fish processing machine and SM power parts 600, 700 or SM relays 800. For corresponding components the reference numerals according to FIG. 1 are used.

Further details and features of the controlling apparatus according to the present invention as shown in the drawings can be gathered from the following functional description of the controlling function.

An angle encoder 400 provides a six-channel bit pattern E4, which corresponds to a fish-specific, i.e. fish-dependent value, e.g. the fish thickness. This signal pattern E4 is supplied across a stabilizing and a suppressing or selecting circuit 51, 52 and across the couplers 53 used for the galvanically separating transfer to the component 42 of control unit 33.

Fish thickness signals are supplied to computer 1 on the basis of input control signals E2 supplied to the input circuit 20. Signals E2 comprise a trigger signal of a conveying trough timing switch 201 defining a specific measuring or detection time; a scanning signal of a switch 202 calling a specific fish position; an enabling or starting signal from a switch 203, according to which signal a fish thickness signal is accepted by the computer 1; as well as machine type checking and operating signals, through whose scanning in particular specific machine type-determining tools are activated. The controlling apparatus is controlled or triggered by means of the input circuit 10 with SM zero position monitoring signals E1 supplied from zero position indicating switches, i.e. signal generators 100 for tool operating states. A fish conveyance check takes place by means of transport(conveyance)-synchronous pulse signals E3 produced by a timing pulse generator 300 and supplied to the input circuit 30. The latter comprises a pulse conditioning circuit 54 with which these signals are conditioned in such a way that only signals relevant for the fish transport are passed on. Outputs of circuits 10, 20 and 30 are connected to the memory and combinatorial component 41. For stabilizing and suppressing disturbance portions, the input circuits 10, 20 and 30 comprise stabilizing and suppression or selecting circuits 51.

On the basis of the input control signals, computer 1 determines data for setting pulses and after storing in a register and counting empty a register of the memory and combinatorial component 43 of control unit 33, which data are supplied to the SM setting pulse generating circuit 6. The latter comprises an input gate 61 for pulse generation during each signal edge change, by which the setting speed of the fish processing tools is determined, an inverting driver 62 used for signal processing, a time stage 63 supplying a pulse with a length necessary for an SM drive, as well as a push-pull output stage 64 for delivering setting pulse signals A1. In order to prevent accidents, on opening machine protective grids or the like, stage 64 is triggered with a signal E5 via an electrical component (not shown in FIG. 1), in order to block the stage, so that no further setting pulses A1 are supplied to the power parts 600.

For positioning fish machine tools the component 41 stores stepping motor (SM) control data for the direction of rotation, for deenergizing, i.e. for eliminating a hold or stoppage moment, and for resetting, which data are coupled in stationary manner into the following machine control zone by means of galvanic separating elements 53 of the circuit 7. There, a circuit 71 ensures a signal processing or conditioning, so that only signals of a specific level, which is in particular greater than 8 volt are processed by a push-pull output stage 72 and are therefore supplied in disturbance-protected manner and in a low-ohmic state to the SM setters, i.e. power amplifiers 700. Any disturbance in the setting tools is reported by associated SM zero position monitoring signals E1 and is taken into account by the control. In this manner, signals A3 determining the SM rotation direction are delivered in parallel to the SM setting pulses A1. An SM rotation direction signal A3 makes an SM setting device 700 carry out several attempts to reach the starting position. During this time the conveying of fish is stopped. If a stepping motor does not reach its desired starting position, then control data of the memory and combinatorial component 41 ensure that the disturbed tool is deenergized by an SM deenergizing signal A2 so that it no longer has a hold moment, whilst a signal A5 switches off the tool motor across a relay 800 as well, due to a control signal of the memory and combinatorial component 42, which controls the output circuit 8. SM resetting signals A4 always ensure a completely satisfactory switching state in the SM power parts, so that no undesired deenergized states occur in particular following a mains turn-on.

The output circuit 8 is designed as a fish conveyance and tool drive control circuit. It comprises an output stage 81 with electronic switches particularly constructed in the form of Darlington transistors. Control data are supplied to the output stage 81 across galvanic separating points 53 from the component 42, so that said stage generates machine operation control signals A5, in particular a knife motor signal as well as a fish conveying signal. Such a signal has in particular a voltage level of 24 volts and allows a current suitable for controlling a positioning element, e.g. a relay 800 in such a way that when a corresponding control instruction occurs the fish conveyance/transport and/or the knife motor and therefore the cutting process are stopped.

For the permanent checking of a measuring and fish treatment process a value obtained from a fish and in particular of its thickness is supplied by the CPU 1 across the component 42 in serial form to the register 91 of the output circuit 9, which is designed as a fish size display circuit and comprises a decoding stage 92 and a multiposition, e.g. a 7-segment-comprising display 37. The registers 91 store the serial data and supply them simultaneously, in parallel and in a stationary way to downstream-connected decoding stages 92, which in particular generate a 7-code A6 from a 4-bit-figure signal, which code A6 is used for controlling the 7-segment displays 37.

For optimizing fish processing the controlling apparatus is equipped with several preselection switches 35 making it possible to pre-determine a specific fish-head length or specific cutting processes, e.g. a flank cut, as well as other processing parameters. The position values of these switches are constantly taken into consideration during fish processing, i.e. a change in the switch position is immediately detected and read and is therefore taken into consideration for the positioning of the processing tools. The switches 35 form part of the control unit 33, being directly controlled and read by the storage and combinatorial component 44, in that with each switch is associated a separate control signal, whilst read signals are supplied from each switch as 4-bit signal patterns, linked by diodes not shown in FIG. 1, to four common read inputs of the component 44.

FIGS. 1 and 2 show the circuiting of the controlling apparatus, as well as the signal generator and power parts with supply units VE 1, VE 2, VE 3 and VE 4 specially associated with and adapted to the design of the controlling apparatus. The unit VE 1 supplies the central processing unit 1, module 2, as well as control unit 33 and the test programme memory device 34 at a voltage V1=5 V. Unit VE 1 is connected to a noise suppression filter VE 11 provided in the peripheral circuit 3. The outer zones of peripheral circuit 3, i.e. the input and output circuits (i.e. the machine control zones) separated from the inner electronic control zone by the galvanic separating elements 53 are operated with the supply unit VE 2, which supplies a voltage V2=5 V, as well as with the supply unit VE 3, which supplies a voltage V3=24 V. A voltage transformation and short-circuit protection circuit VE 21 for generating the voltage V2, housed in the peripheral circuit part 3 and connected to unit VE 3 can be provided within the peripheral circuit 3 in place of circuit VE 2. Supply unit VE 3 also supplies the signal generators 200, 300 and 400. A 24 volt-supplying supply unit VE 4 is provided for supplying the push-pull output stage 64 of the SM setting pulse generating circuit 6.

Figure 3:
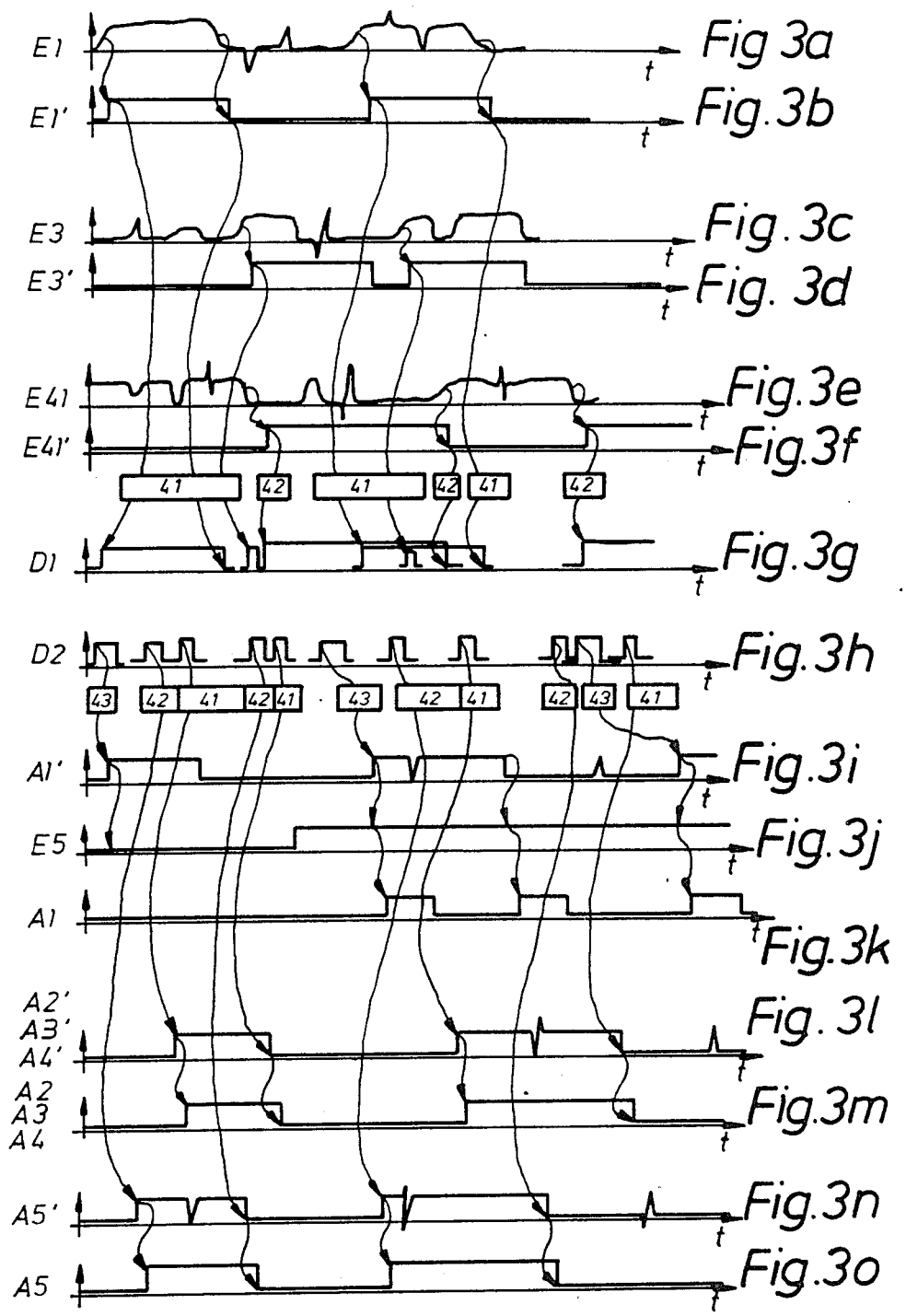
FIGS. 3a to 3o shows signal diagrams for control signals, as well as input and output signals of an apparatus according to the present invention.

In FIGS. 3a to 3o are plotted the signals or values of input and output quantities of the circuits over time.

By means of one circuit portion of circuit 10, a disturbed SM zero position monitoring signal E1 (FIG. 3a) is converted into a stabilized, disturbance-suppressed output signal E1' (FIG. 3b). Corresponding signal conditions or signal sequences occur in the signals E2 controlling the input circuit 20. A disturbed fish conveyance pulse signal E3 (FIG. 3c) is given the form E3' (FIG. 3d) by the action of a circuit portion of circuit 30. A disturbed fish measuring value signal E41 (FIG. 3e) is converted into a stabilized and conditioned signal E41' (FIG. 3f) by a circuit portion of the circuit 40. As a result of a control operation by the combinatorial component 41 for signals E1' and E3', as well as due to a control operation by the combinatorial component 42 for the signal E41', a parallel data bus D1 (FIG. 3g) results at the input of module 2. Due to the calculating and combinatorial operations of the controlling apparatus, the data bus D1 leads to a parallel data bus D2 (FIG. 3h) at the output of module 2. As a result of further control sequences in the control unit 33, the combinatorial component 43 delivers a SM control signal A1' (FIG. 3i), which is disturbance-suppressed and conditioned by a part of the SM setting pulse generating circuit 6 in such a way that SM positioning pulses A1 (FIG. 3k) are obtained for controlling the SM power parts. It can be seen that there is no supply of SM setting pulse signals A1 for as long as the SM control signal E5 (FIG. 3j) assumes a zero level. A control signal A2', A3' or A4' (FIG. 3l) is read out from the combinatorial component 41 and, after disturbance suppression, stabilization and conditioning by an association circuit part of output circuit 7, leads to a deenergizing circuit A2, a rotation direction signal A3 or a resetting signal A4 for a stepping motor (FIG. 3m), respectively. A machine operating control signal A5' (FIG. 3n) is read out from the combinatorial component 42 for the control of the knife motor and/or the fish conveyance and also undergoes disturbance suppression and conditioning in an associated portion of the fish conveying and tool drive control circuit 8, so that the output circuit 8 delivers signals A5 (FIG. 3o). The signal diagrams represent the signal change due to a rising edge or declining edge or at a specific signal level with reference lines running between the diagrams associating the respective state of a resultant signal with the controlling signal, the control by the components 41, 42, 43 being diagrammatically represented by corresponding boxes.

Figure 4:
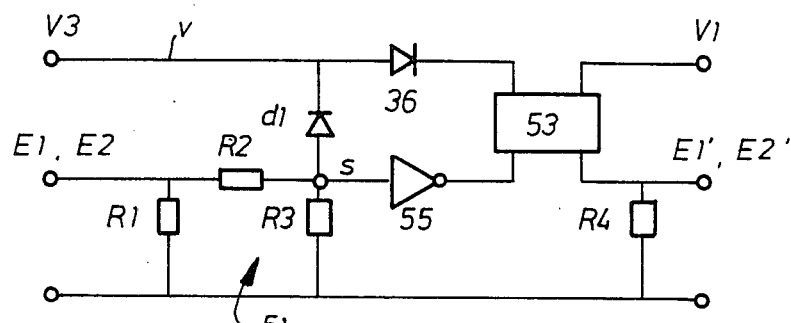
FIG. 4 shows a control circuit for input parameter signals.

FIG. 4 shows a circuit suitable for the purposes of the invention provided in a controlling apparatus according to the present invention as a control parameter input circuit, i.e. as an SM zero position indicating circuit 10 or as the control circuit 20 for the fish position signals and/or machine operation signals. At the input of a $\pi$-circuit, the circuit comprises ohmic resistors R1, R2 and R3, to which is supplied an input signal E1 or E2. For blocking out disturbances a shunt diode d1 is connected between signal line s and the supply voltage line v. The control signal is supplied across a CMOS semiconductor component, namely an inverting amplifier 55, to an optical coupler 53 operated with the voltage V1=5 V. Signal E1' or E2' is supplied across a resistor R4 to the circuit output. A display element 36 in the form of a light-emitting diode (LED) is provided for optical display purposes. The circuit is dimensioned in such a way that the switching or operating level $U>10$ V relevant for the fish control values is obtained at a current $I>6$ mA.

Figure 5:
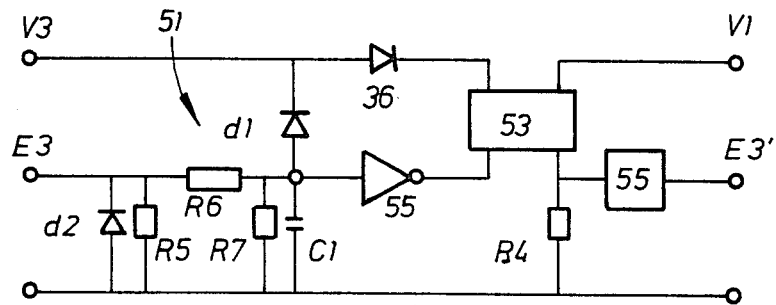
FIG. 5 shows a fish path pulse generating circuit.

According to FIG. 5, an embodiment of an input pulse control circuit 30 according to the present invention comprises an ohmic resistance circuit R5, R6 and R7 with a diode d2 parallel to R5 and a capacitor C1 parallel to R7. Otherwise the circuit configuration corresponds to the circuit according to FIG. 4, but a pulse shaping circuit 54 is provided at the circuit output. The circuit 30 is dimensioned in such a way that a pulse relevant for the fish path has a voltage level of $U>10$ V and corresponds to a current of $I>3$ mA. Short single-shot, noise or spurious pulses corresponding to no fish conveying path are suppressed. When an edge or flank of an input signal occurs, the pulse shaping circuit 54 delivers an output signal of specific length. If the output signal is still present and a further input signal edge occurs, the latter has no effect.

Figure 6:
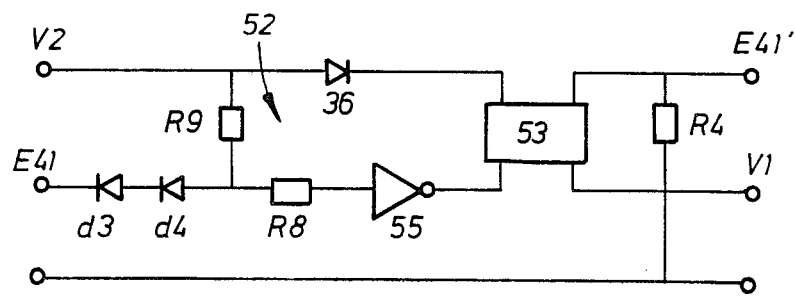
FIG. 6 shows a fish data input circuit.

FIG. 6 shows a fish data input circuit according to the present invention. With the input of a control channel, e.g. E41 of a fish data bit pattern E4 corresponding to several channels, there is associated a diode pair d3, d4 with a series-connected resistor R8, the signal being supplied to an inverting amplifier 55. The output part of the circuit including display element 36, optical coupler 53 and resistor R4 corresponds to the construction of the circuit according to FIG. 4. However, the element 36 is connected to a diode d4 via an ohmic resistor R9, there being a voltage of $V2=5$ V at R9 and the element 36. The circuit is designed in such a way that a bit signal relevant for the fish value measurement has a voltage $U>4$ V, whilst for irrelevant signals for a fish measurement there is a voltage of $U<0.5$ V and a current of $I<8$ mA.

Figure 7:
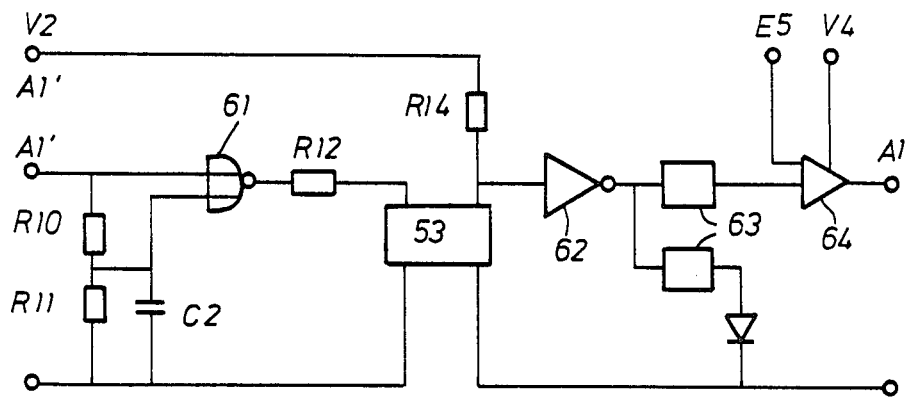
FIG. 7 shows a stepping motor (SM) setting pulse generating circuit.

An SM-setting pulse generating circuit 6 as shown in FIG. 7 comprises in the input zone a combination of two resistors R10 and R11, as well as a capacitor C2, such that a control pulse signal A1' controls an inverting exclusive-OR gate 61. The output of the gate is connected across an ohmic resistor R12 to an optical coupler 53. A Schmitt-trigger circuit 62, i.e. an inverting driver stage is provided for processing a decoupled signal. The output of this driver stage is connected to a time stage 63. A push-pull output stage 64, which supplies a positioning pulse signal A1 to an associated stepping motor, is connected downstream of time stage 63. A display element 36 is provided for the display of a pulse sequence. The circuit ensures that a setting pulse is delivered at the output for each signal change occurring at the input. This pulse has a length necessary for a stepping motor setting drive. Each setting pulse has a level of 24 volt. The output of the push-pull output stage is connected in low-ohmic manner with an associated SM power part. When the push-pull output stage 64 is supplied with a suitable control signal E5, the 24 V signal level changes to a zero volt level, so that the switching stages of the push-pull output stage 64 are blocked, i.e. no setting pulses are supplied to the SM power parts. The output of the optical coupler 53 and the input of the drive stage 62 are supplied with the voltage V2=5 V via an ohmic resistor R14.

Figure 8:
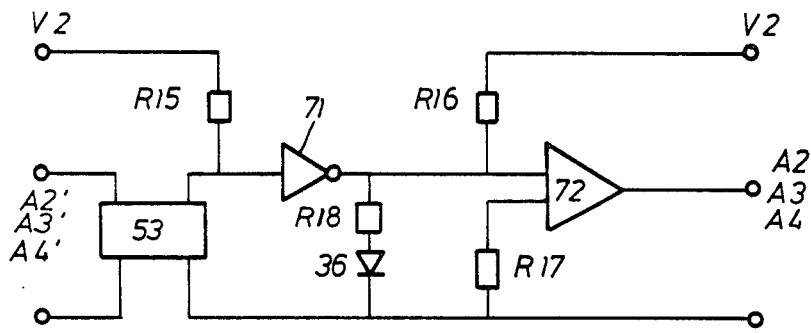
FIG. 8 shows an operating state control circuit for the stepping motor and the fish conveyance.

An SM-control circuit 7 according to FIG. 8 suitable for generating an SM deenergizing signal A2, an SM rotation direction signal A3 or an SM-resetting signal A4 comprises, on the input side, an optical coupler 53 controlled by a signal A2', A3' or A4'. The output of this coupler 53 is connected to an inverting amplifier circuit 71 connected on the output side to the input of a push-pull output stage 72. The input of the push-pull circuit is connected to a voltage divider comprising ohmic resistors R16 and R17 and which is between the zero potential and the voltage supply V2=5 V. The optical coupler is supplied with the voltage V2 via a resistor R15. A display element 36 connected across a resistor R18 to the zero volt level is provided at the output of the amplifier 71. The circuit is designed in such a way that only signal levels with U>8 V are processed by the push-pull output stage 72 and are supplied in disturbance-free, i.e. low-ohmic manner to associated stepping motor setting means.

Figure 9:
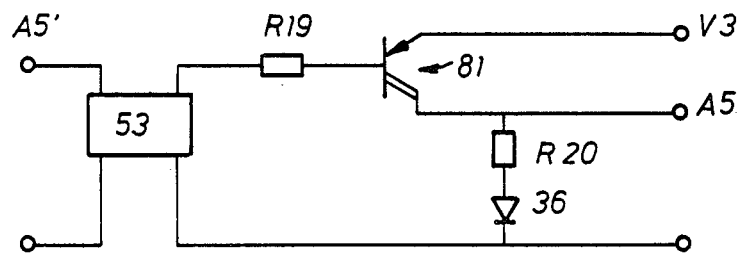
FIG. 9 shows a control circuit for the tool drive and/or fish conveyance.

According to FIG. 9, a circuit 8 for supplying a fish conveying signal or knife motor signal A5 and thus suitable for controlling the fish conveyance or the tool drive has an output stage in which, by means of an ohmic resistor R19, a Darlington transistor 81, serving as the electronic switch, is controlled, a control signal A5' being supplied via a galvanically separating optical coupler 53 to the input of the circuit. An optical signal display takes place by means of a light-emitting diode (LED) serving as the display element 36, which across a resistor R20, is connected between the output line and the zero volt level. The output part A5 has a voltage level of 24 volts and allows a current permitting the control of a setting element, particularly a relay. The Darlington transistor 81 of the output stage is connected to the voltage V3=24 V.

Figure 10:
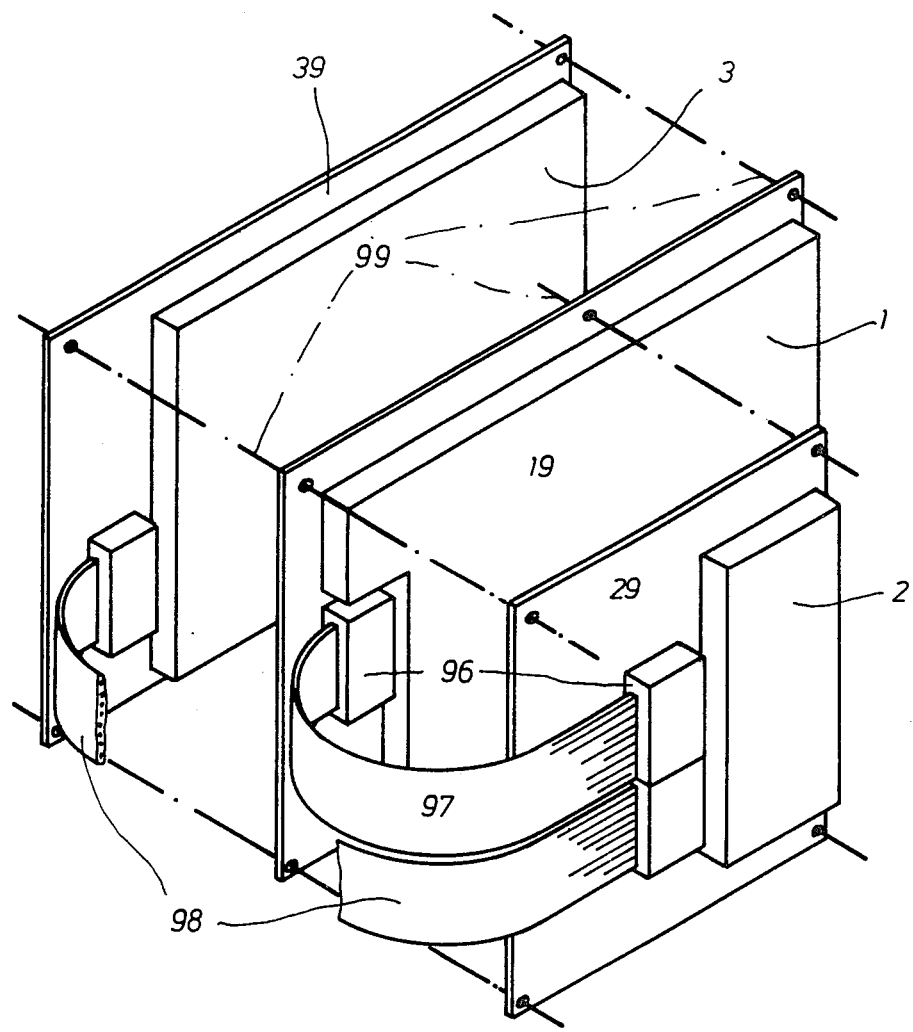
FIG. 10 shows a mounting plate constructional unit of an apparatus according to the present invention in an exploded representation mode.

FIG. 10 shows the structure of an electronic controlling apparatus forming a compact constructional unit. It comprises three mounting plates 19, 29 and 39 arranged in a stack with their surfaces parallel. A first mounting plate 29 carries the apparatus module 2, the second or central mounting plate 19 carries the first apparatus module 1, and the third mounting plate 39 carries the apparatus module 3. Each module 1, 2 or 3 is separated from the adjacent module or modules by the respective intermediate mounting plate. Mechanical connecting means 99, not shown in detail, permit a very compact, small and stable unit to be constructed, the space between the mounting plates being taken up by a module and being determined by the dimensions thereof.

Electrical connections between the modules 1 and 2 as well as 2 and 3 are provided by means of flat cables 97, 98 detachably connected to the modules by means of plug-in elements 96. It can be seen that an easily installable overall functional unit, which can, in particular, be assembled in modular manner is provided, which can be positioned within a controlled fish machine. As a result of the specific electrical functions associated with the individual modules and the described spatial association or sequence of the individual components, it is ensured that undesired reactions are avoided within the constructional unit. The stacking of the mounting plates ensures the necessary separation and shielding of or with respect to electromagnetic fields.

What is claimed is:

1. An electronic controlling apparatus for use in a fish processing machine comprising a conveying path for fish to be processed with processing means arranged along said conveying path and at least including tools and guides which are controlled with respect to their operational times and movements, as well as setting elements for setting the operational times and control paths of said processing means, said controlling apparatus being adapted to control said setting elements and comprising
   (a) a first modular unit forming a programmable central processor (CPU) for storing fish species data and data of said fish processing machine;
   (b) a second modular unit connected to said first unit and including signal amplifying and adapting means; and
   (c) a third modular unit designed as peripheral circuit means for said central processor, which third unit includes a control unit, connected to said second unit and forming in common memory, combinatorial and controlling means for detected fish value data, input and output control data, as well as an input part and an output part, each connected to said control unit and adapted for signal decoupling, conditioning, processing and disturbance elimination.

2. An apparatus as claimed in claim 1, wherein said input part and said output part comprise optical display elements for all signals representing detected fish value data as well as input and output control data.

3. An apparatus as claimed in claim 2, wherein said optical display elements are provided in the form of light emitting diodes.

4. An apparatus as claimed in claim 1, wherein said output part comprises fish size display circuit means with a register, a decoding stage and multiposition segment display means for the fish size.

5. An apparatus as claimed in claim 1, wherein said input and output parts comprise elements for galvanic decoupling.

6. An apparatus as claimed in claim 5, wherein said elements are provided as optical couplers.

7. An apparatus as claimed in claim 1, wherein said input part comprises input circuits for suppressing disturbances, as well as for stabilizing input signals.

8. An apparatus as claimed in claim 1, wherein said input part comprises fish path input pulse circuit means, which comprise signal processing and pulse shaping circuit means.

9. An apparatus as claimed in claim 1, wherein said output part includes stepping motor setting pulse circuit means for supplying stepping motor setting pulse signals, which circuit means comprise an input gate, an inverter, a time stage and a push-pull output stage.

10. An apparatus as claimed in claim 9, wherein said input gate is an inverting exclusive-OR gate.

11. An apparatus as claimed in claim 1, wherein said output part includes circuit means for delivering a deenergizing signal, a rotation direction signal and a resetting signal for stepping motor means, which circuit means comprise a signal conditioning circuit as well as a push-pull output stage, respectively.

12. An apparatus as claimed in claim 9, wherein said push-pull output stage comprises thermal monitoring means.

13. An apparatus as claimed in claim 11, wherein said push-pull output stage comprises thermal monitoring means.

14. An apparatus as claimed in claim 1, wherein said output part comprises control means for the fish conveyance of said fish and for drives of said tools, which control means are provided with an output stage.

15. An apparatus as claimed in claim 14, wherein said output stage comprises a current limiting circuit.

16. An apparatus as claimed in claim 1, wherein circuit means are provided for generating four separate supply voltages for the supply of said apparatus.

17. An apparatus as claimed in claim 1, wherein said control unit is connected to a preselection/setting switch unit.

18. An apparatus as claimed in claim 1, wherein said control unit comprises four memory and combinatorial components, a first component being provided with an input for priority processing and adapted to store and generate control signals corresponding to the rotation direction of stepping motor means, deenergizing signals and resetting signals, a second component storing and generating serial display data as well as control signals corresponding to signals for tool drives and fish conveyance, a third component storing and generating pulse sequence values for a stepping motor, and a fourth component being adapted to interrogate and control a switch unit for preselection and setting.

19. An apparatus as claimed in claim 1, wherein said peripheral circuit means comprise a memory device storing test programmes, which device is connected between said control unit and said adapting means.

20. An apparatus as claimed in claim 1, which is designed with three electrically and mechanically connected mounting plates as a constructional unit for at least one of the installation in and the connection to a fish processing machine, a first mounting plate carrying said second unit, a second mounting plate carrying said first unit, and a third mounting plate carrying said third unit, these plates being sequentially interconnected and being stacked.

* * * * *